United States Patent [19]
Hahn et al.

[11] Patent Number: 5,374,990
[45] Date of Patent: Dec. 20, 1994

[54] ACTIVE MAGNETIC FIELD TUNING FOR DISPERSION EQUALIZATION OF A MULTI-OSCILLATOR

[75] Inventors: Tae W. Hahn, Chatsworth; Daniel A. Tazartes, West Hills; John G. Mark, Pasadena, all of Calif.

[73] Assignee: Litton Systems, Inc., Beverly Hills, Calif.

[21] Appl. No.: 45,905

[22] Filed: Apr. 12, 1993

Related U.S. Application Data

[63] Continuation-in-part of Ser. No. 741,291, Aug. 6, 1991, Pat. No. 5,208,653, which is a continuation-in-part of Ser. No. 640,179, Jan. 11, 1991, Pat. No. 5,074,664.

[51] Int. Cl.[5] ............................................. G01C 19/64
[52] U.S. Cl. .................................................... 356/350
[58] Field of Search ........................... 356/350; 372/94

[56] References Cited

U.S. PATENT DOCUMENTS

| | | | |
|---|---|---|---|
| 4,247,832 | 1/1981 | Sanders et al. | |
| 4,470,701 | 9/1984 | Smith | 356/350 |
| 4,482,249 | 11/1984 | Smith, Jr. et al. | |
| 4,652,132 | 3/1987 | Nelson et al. | 356/350 |
| 4,687,331 | 8/1987 | Holz et al. | 356/350 |
| 4,960,331 | 10/1990 | Goldman et al. | |
| 4,963,026 | 10/1990 | Hahn | 356/350 |
| 5,074,664 | 12/1991 | Mark et al. | 356/350 |

OTHER PUBLICATIONS

Chow, Weng W. et al., "Multioscillator Laser Gyros", *IEEE Journal of Quantum Electronics*, vol. QE-16, No. 9, Sep. 1980.

*Primary Examiner*—Samuel A. Turner
*Attorney, Agent, or Firm*—Nilsson, Wurst & Green

[57] ABSTRACT

Dispersion in a multi-oscillator cavity is equalized by processing information extracted from the laser beams within the cavity to generate an error signal representative of dispersion bias, and applying a bias control signal to the cavity in such a way as to null the error signal. The bias control signal is preferably a magnetic field applied to the gain medium of the cavity by passing a corresponding current through a coil surrounding the medium. In exemplary embodiments, the laser beams are modulated by modulating the applied magnetic field and/or the path length of the cavity.

25 Claims, 6 Drawing Sheets

BIAS SENSITIVITY VS CLC & MAGNETIC FIELD

ACTIVE MAGNETIC FIELD TUNING FOR DISPERSION EQUALIZATION OF A MULTI-OSCILLATOR

This application is a continuation-in-part of U.S. patent application Ser. No. 07/741,291 filed Aug. 6, 1991 by Tazartes et al. for MULTI-OSCILLATOR RING LASER GYROSCOPE ADAPTIVE DIGITALLY CONTROLLED CAVITY LENGTH CONTROL SYSTEM, now U.S. Pat. No. 5,208,653, which itself is a continuation-in-part of application Ser. No. 07/640,179 filed Jan. 11, 1991 for COMPUTER GENERATED CAVITY LENGTH CONTROL FOR RING LASER GYROS, now U.S. Pat. No. 5,074,664.

BACKGROUND OF THE INVENTION

1. Field of the Invention

This invention relates to dispersion equalization in multi-oscillators and, more particularly, to active magnetic field tuning for dispersion equalization in a multi-oscillator cavity.

2. Description of the Prior Art

Multi-oscillators have been proposed as a way of overcoming the "lock-in" problem encountered in ring laser gyroscopes. In essence, a multi-oscillator operates as a pair of two-mode ring laser gyroscopes that share a single light cavity. The multi-oscillator cavity sustains a substantially left circularly polarized (LCP) beam pair, comprising one beam propagating within the cavity in the clockwise direction and another in the counter-clockwise ("anticlockwise") direction having angular frequencies $W_{LC}$ and $W_{LA}$, respectively. The multi-oscillator cavity further sustains a substantially right circularly polarized (RCP) beam pair comprising counter-propagating beams having angular frequencies $W_{RC}$ and $W_{RA}$. Ideally each beam pair acts independently as a two-mode ring laser gyroscope and senses body rotation by means of the Sagnac effect.

In order to achieve independent operation of two gyroscopes within the same cavity, the two beam pairs, one of LCP light and the other of RCP light, are caused to operate about different frequencies. This separation of frequencies is known as "reciprocal splitting" and is typically on the order of hundreds of megahertz (MHz) (see FIG. 1A). Early multi-oscillator designs achieved the necessary reciprocal splitting by placing a suitably aligned optically active element in a cavity. More recent designs achieve reciprocal splitting by providing a nonplanar ray path.

With reciprocal splitting invoked, the two pairs of counterpropagating beams function independently, but each still suffers from lock-in. Unlike a two-mode gyro in which lock-in is overcome with a mechanically applied bias such as body dither, the multi-oscillator circumvents the lock-in problem by applying an optical bias to the two gyros so that each operates about a point far removed from the "dead band" where the gyros give no output. This bias is known as "nonreciprocal splitting" and is normally accomplished by a Faraday rotator, an intracavity element made of suitable glass and mounted within an axial magnetic field.

When circularly polarized light passes through a Faraday rotator, it experiences a phase shift that depends on the direction of propagation through the rotator. Thus, the clockwise and anticlockwise beams of each gyro experience different phase shifts, causing them to lase at different frequencies. Typical values for the nonreciprocal splitting in a multi-oscillator are on the order of MHz.

Nonreciprocal splitting can also be achieved by surrounding the gaseous gain medium of the cavity with an axial magnetic field. This phenomenon is known as "Zeeman splitting".

When nonreciprocal splitting is applied to the multi-oscillator in the prescribed manner, the resulting bias shift in the LCP gyro is equal but opposite in sign to the bias shift in the RCP gyro. This yields the four distinct resonant frequencies (or modes) illustrated in FIG. 1A. These include: an LCP clockwise beam ($W_{LC}$) having an amplitude ($A_{LC}$), an LCP anticlockwise beam ($W_{LA}$) having an amplitude ($A_{LA}$), an RCP clockwise beam clockwise beam ($W_{RA}$) having an amplitude ($A_{RC}$), and an RCP anticlockwise beam ($W_{RA}$) having an amplitude ($A_{RA}$)

When the outputs of the two differently polarized gyros of a multi-oscillator are combined, the resultant signal is doubly sensitive to body rotation but independent of the magnitude of the applied bias. In this way, the differential nature of the multi-oscillator makes it inherently insensitive to many large bias variations.

Unfortunately, however, nonplanar multi-oscillator cavities are susceptible to significant drift errors due to "dispersion", which is a frequency dependent index of refraction associated with the gain of the laser medium used. The four modes of such a cavity are therefore shifted in frequency by different amounts due to the presence of the gain medium, causing undesired drift in cavity output. This condition is shown in the mode diagram of FIG. 1A by the fact that the gain curve 10 is asymmetric, causing the amplitudes of the LCP and RCP laser beams to be unequal. In addition, a helicity dependence (shown in FIG. 1B) may be present. This can cause an amplitude difference between the LCP clockwise mode and the LCP anticlockwise modes and between the RCP clockwise and RCP anticlockwise modes. The helicity dependence of the gain curve is affected by magnetic fields applied to the gain medium.

The phenomenon of dispersion is discussed in U.S. Pat. No. 4,470,701 to Irl W. Smith, which purports to eliminate error due to dispersion by applying a magnetic field to the gain medium at a level proportional to the magnitude of the split in frequency provided by a Faraday rotator. The magnitude of the Faraday bias is measured by optically separating the LCP and RCP beam pairs and averaging the frequencies of the resulting signals. This average is multiplied by appropriate proportionality constants and applied to the coil as a control signal. Unfortunately, the bias control signal calculated in an open loop fashion according to the Smith '701 patent is itself dependent on a number of variables which are not accounted for by the technique disclosed therein. The output of a cavity "corrected" in this way therefore remains subject to the adverse effects of dispersion.

Thus, it is desirable in many applications to provide a system for accurately equalizing dispersion in a multioscillator cavity and thereby eliminating dispersion drift error.

SUMMARY OF THE INVENTION

The system and method of the present invention equalize dispersion in a multi-oscillator cavity by processing information extracted from the laser beams within the cavity to generate an error signal representative of dispersion bias, and applying a magnetic bias control signal to the cavity in such a way as to null the error signal. The magnetic bias control signal is preferably a magnetic field applied to the gain medium of the cavity by passing a corresponding current through a coil surrounding the medium. By carefully selecting the nature of the information extracted from the beams and the mechanics of the nulling process, particular variables can be isolated and controlled to eliminate drift errors due to dispersion independently of the values of other variables. Along these lines, the nulling process can be facilitated by modulating the laser beams.

In a first preferred embodiment, the path length of the cavity is modulated and the heterodyne output of the cavity is subsequently demodulated to isolate the difference in the output caused by modulation. This difference in heterodyne output is related to the dispersion error and is used to generate a correction value to be applied to the magnetic bias control coil. Thus, the modulation/demodulation method of the first preferred embodiment provides an active feedback loop for nulling the error signal by adjustment of the bias control signal. In many cases, it is desirable to modulate the bias control signal, as well, and adjust the path length of the cavity to null the resulting error. Whenever this is done, however, it is preferred that the modulation be in quadrature, i.e., that only one of the two variables deviate from its optimal value at any given time. Such modulation prevents errors from being introduced into the primary "rate" output of the cavity.

In a second embodiment, the laser beams are modulated by "dithering" the magnetic bias control signal of a multi-oscillator cavity and comparing the total clockwise beam (both LCP and RCP) with the total anticlockwise beam to isolate the difference between them. The difference is then amplitude demodulated and passed through a synchronous detector and the integrated output of the detector is applied to the magnetic coil as a magnetic bias control signal. The control loop thus detects the error in the amplitude term and generates a magnetic bias control signal suitable to null the error and thereby equalize dispersion. Although this portion of the method is quite effective on its own, if combined with a similar dithering of the path length followed by demodulation and synchronous detection of either the total clockwise or the total anticlockwise amplitude, the total dispersion error can be nulled on a continuous basis.

BRIEF DESCRIPTION OF THE DRAWINGS

The above and other features of the present invention may be more fully understood from the following detailed description, taken together with the accompanying drawings, wherein similar reference characters refer to similar elements throughout and in which.

DESCRIPTION OF THE PREFERRED EMBODIMENTS

Figure 2:
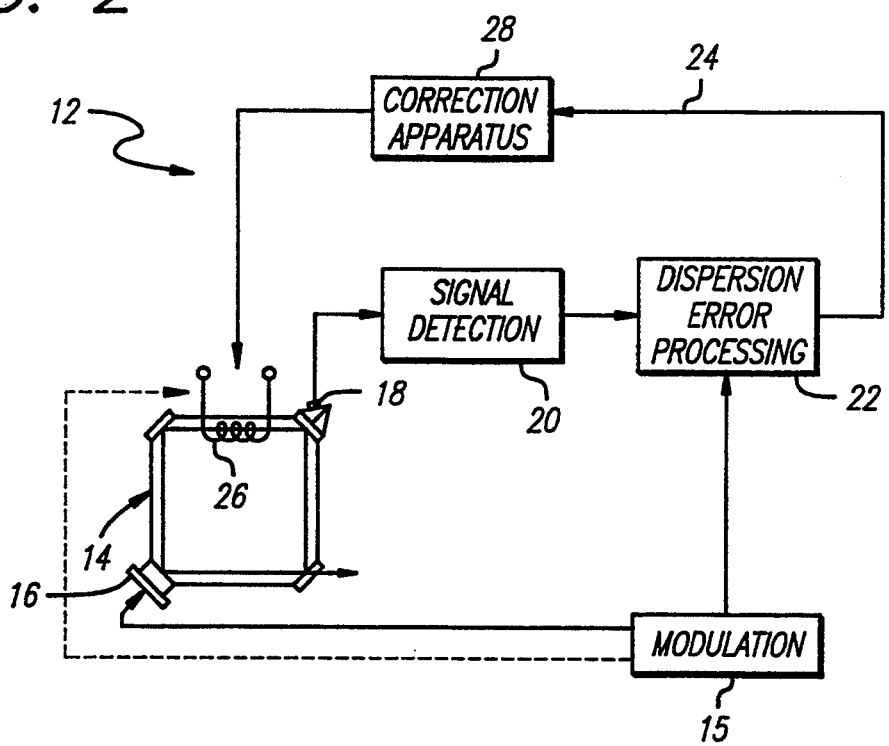
FIG. 2 is a simplified block diagram of a dispersion equalization system constructed according to a preferred embodiment of the present invention.

Referring now to FIG. 2, which illustrates a dispersion equalization system 12 constructed according to a preferred embodiment of the present invention, laser beams resonant within a multi-oscillator cavity 14 are preferably modulated by apparatus 15 which applies a modulated path length control signal to a transducer-controlled mirror 16 associated with the cavity. Information contained within the modulated laser beams is extracted from the cavity by one or more photodiodes 18 and signal detection circuitry 20. The extracted information is subsequently processed by dispersion error processing apparatus 22 to generate an error signal 24 representative of dispersion bias. The error signal 24 is then used to generate a correction to the magnetic bias control coil 26 through correction apparatus 28. The correction apparatus 28 preferably includes a voltage to current converter which causes an appropriate magnetic field control current to pass through the coil 26. Thus, the dispersion equalization system 12 provides active feedback for controlling the current to the coil 26 in such a manner as to null an error signal and thereby equalize the effects of dispersion. Although the laser beams within the multi-oscillator cavity 14 are depicted as being modulated through transducer-controlled mirror 16, in some instances another aspect of cavity operation is varied in order to produce the beam modulation required to null the dispersion error signal. For example, the modulation apparatus 15 can be used to modulate magnetic field. This possibility is indicated in broken lines in FIG. 2 and is explored in greater detail below in connection with the embodiments of FIGS. 6 and 7.

Figure 1A:
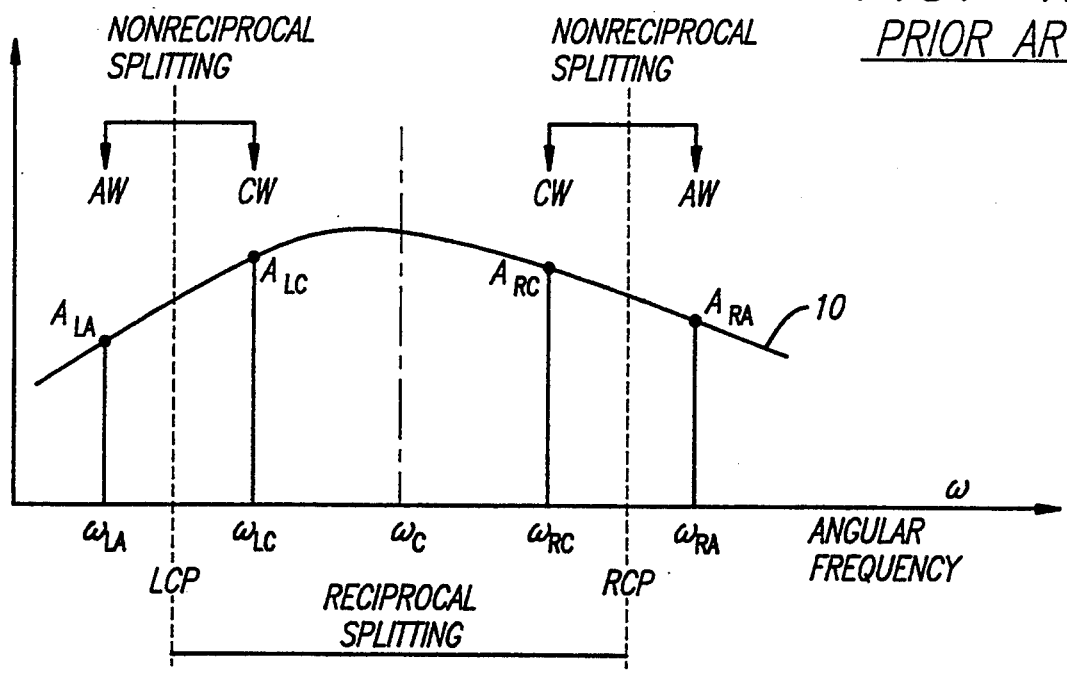
FIG. 1A illustrates a gain curve of a prior art multi-oscillator cavity having four distinct resonant modes.
Figure 1B:
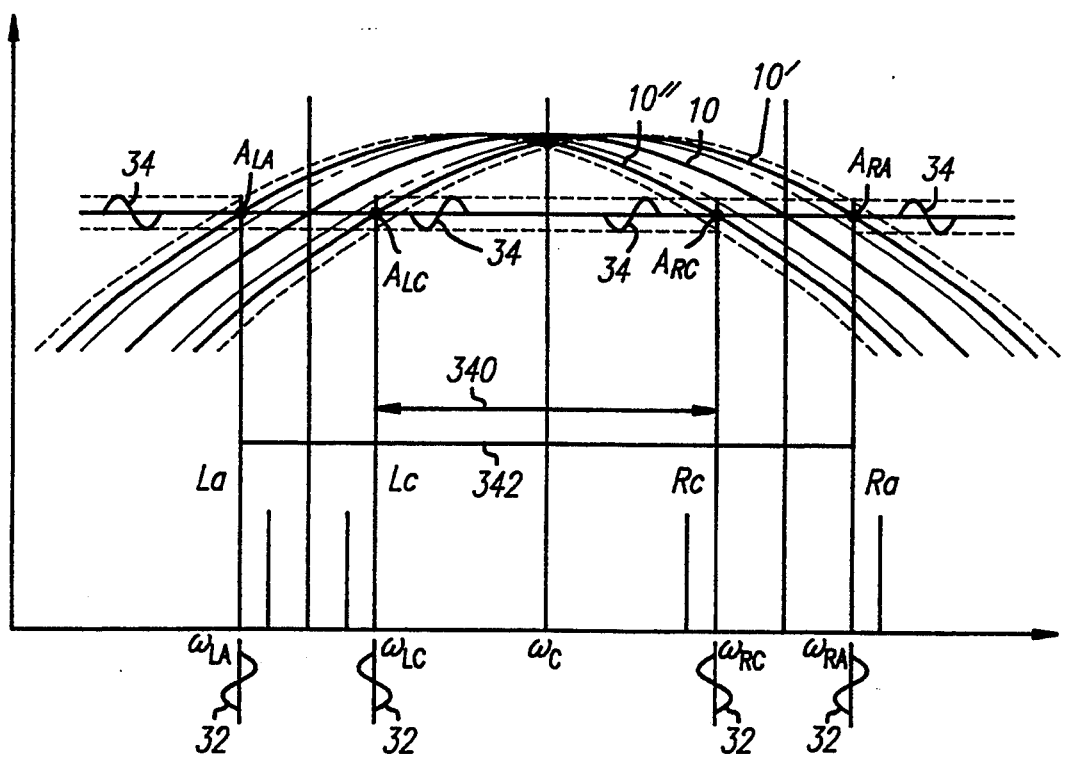
FIG. 1B illustrates the gain curve of a multi-oscillator cavity subjected to magnetic field modulation according to the present invention.

The operation of the system 12 is best understood in conjunction with FIG. 1B, which illustrates the separation of the gain curve 10 into two separate gain curves, 10' and 10", due to nonreciprocal splitting of the LCP and RCP pairs of beams, respectively. Due to the different helicities of the beams within the cavity, two of the beams interact with the gain curve 10' and the other two interact with the gain curve 10. Thus, the LCP clockwise beam and the RCP anticlockwise beam interact with the gain curve 10', while the LCP anticlockwise beam and the RCP clockwise beam interact with the gain curve 10". This permits the amplitudes of the four beams, $A_{LC}$, $A_{LA}$, $A_{RC}$ and $A_{RA}$, to be equalized by applying a preselected magnetic bias which shifts the curves 10' and 10" laterally relative to one another. Under these circumstances, dispersion does not create an error in the output of the gyro and thus is said to be "equalized".

The effect of modulating the applied magnetic field is illustrated in FIG. 1B by the two curves (one in broken lines and one in phantom lines) bordering each of the solid curves 10' and 10". In response to a waveform 32 applied by way of the applied magnetic field, the path length of the cavity, or both, the gain curves "seen" by the beams within the cavity also modulate between the illustrated extremes. As a result, the various beams are modulated in amplitude, as illustrated by the waveform 34, and in frequency (not shown). Either the amplitudes of the various beams can be compared or the frequency differences caused by modulation can be measured by the dispersion error processing apparatus 22 of the system 12 (FIG. 2) to create an error signal representative of dispersion bias. The error signal is then integrated and applied as a correction to the bias control signal. Because the modulation gives rise to error signals of differing signs and these signals are integrated over time, the corrections continue until dispersion is equalized. The system 12 thus nulls the error due to dispersion and actively maintains it in a nulled condition despite changes in the cavity's operating environment.

It is to be understood that the system 12 of FIG. 2, along with the more specific embodiments illustrated below, can be implemented in either analog or digital forms. In this context, the digital forms of the system typically utilize a microprocessor serving other functions associated with the cavity and are implemented largely by software modifications to the more standard control and output circuitry. Thus, the specific functional entities of the system 12, which are identified herein as "control loops", "apparatuses", and the like, may be implemented in the form of software run on a microprocessor.

Figure 3:
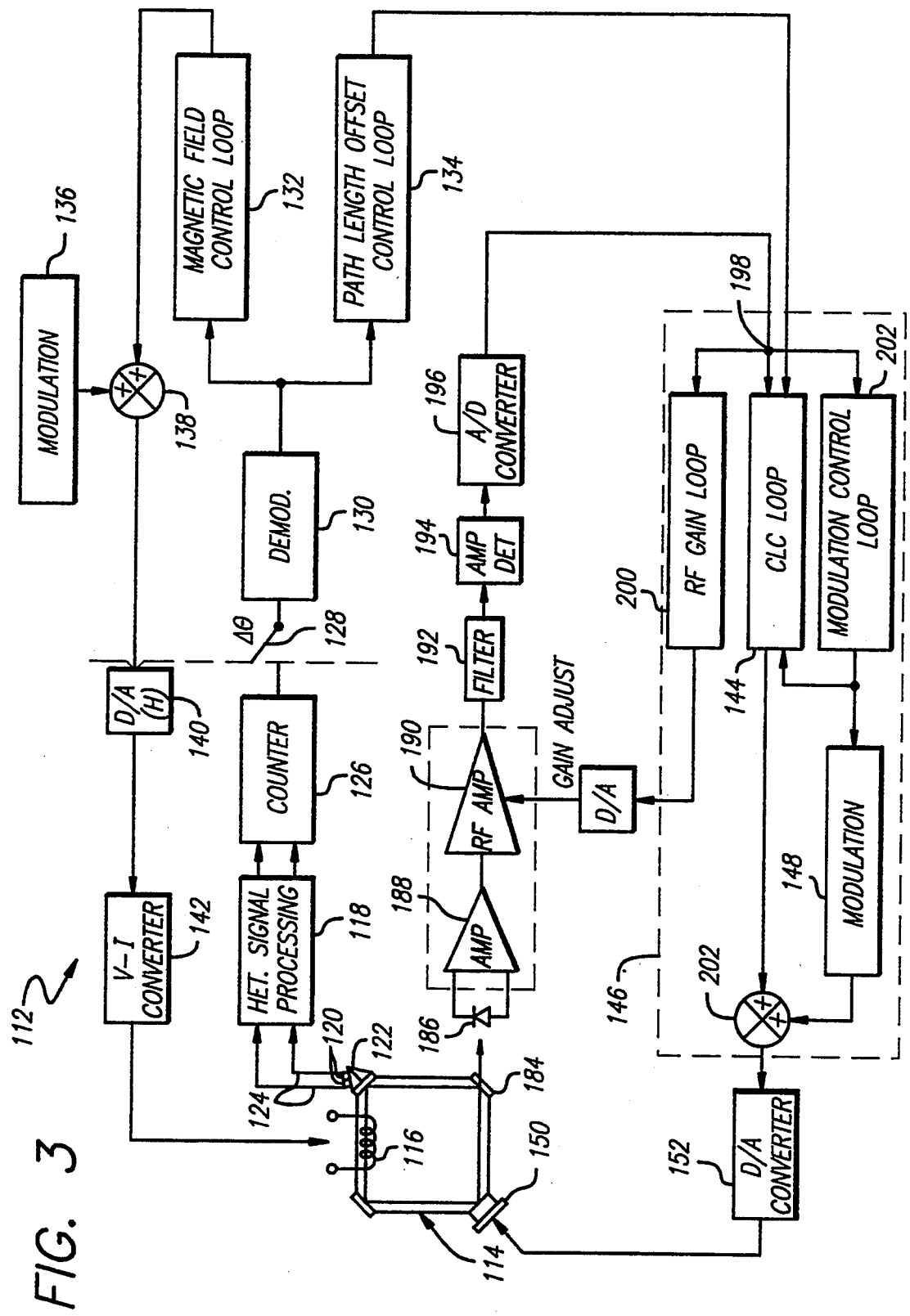
FIG. 3 is a more detailed block diagram of a dispersion equalization system constructed according to another preferred embodiment of the invention.

With reference now to FIG. 3, which illustrates a dispersion equalization system 112 constructed according to a more specific embodiment of the present invention, information is extracted from the laser beams within the cavity by a heterodyne (het.) signal processor 118 acting in conjunction with a pair of diodes 120 of a sensing output 122 of the cavity 114. The het. signal processor 118 receives "up" and "down" counts from the two differently polarized pairs of laser beams along lines 124 and outputs them to a counter 126 which is sampled at a rate of 2048 Hertz by a sampler 128. The sampled signal is fed to a demodulator 130, the output of which is used as an error signal and integrated by a magnetic field controller 132 and a path length offset controller 134 to permit generation of corrections to the applied magnetic field and the path length offset, respectively. The output of the magnetic field controller 132 is added to the output of a modulation source 136 at a summing point 138 to create a modulated magnetic bias control signal which is applied to the magnetic field coil 116 through a digital-to-analog converter 140 and a voltage-to-current converter 142. In order to address amplitude differences due to gain curve asymmetry, a path length offset must be inserted in order to shift the gain curve toward one set of the modes (i.e., either the LCP or RCP side). The path length offset controller 134 processes an error signal potentially attributable to the path length of the cavity 114 and applies a path length offset correction to a cavity length control loop 144 of cavity length control apparatus 146. As described below, the cavity length control apparatus 146 contains a modulation source 148 which modulates a path length control signal generated by the cavity length control loop 144 for application to a path length control mirror 150 of the cavity 114 through a digital-to-analog converter 152.

The cavity length control apparatus 146 of the dispersion equalization system 112 is preferably identical to that disclosed in co-pending U.S. patent application Ser. No. 07/741,291 filed Jun. 6, 1991 by the inventors herein, except that the output of the path length offset controller 134 takes the place of a calibration constant ($P_{OFF}$) of the system disclosed therein. The disclosure of application Ser. No. 07/741,291 is hereby incorporated by reference for all purposes.

In the system of application Ser. No. 07/741,291, a control loop is used to adjust the cavity length to the calibration value, $P_o$, using a modulation waveform which sequentially cycles the path length to the values, $$P_o, P_o+\Delta P, P_o, P_o-\Delta P$$

Figure 5:
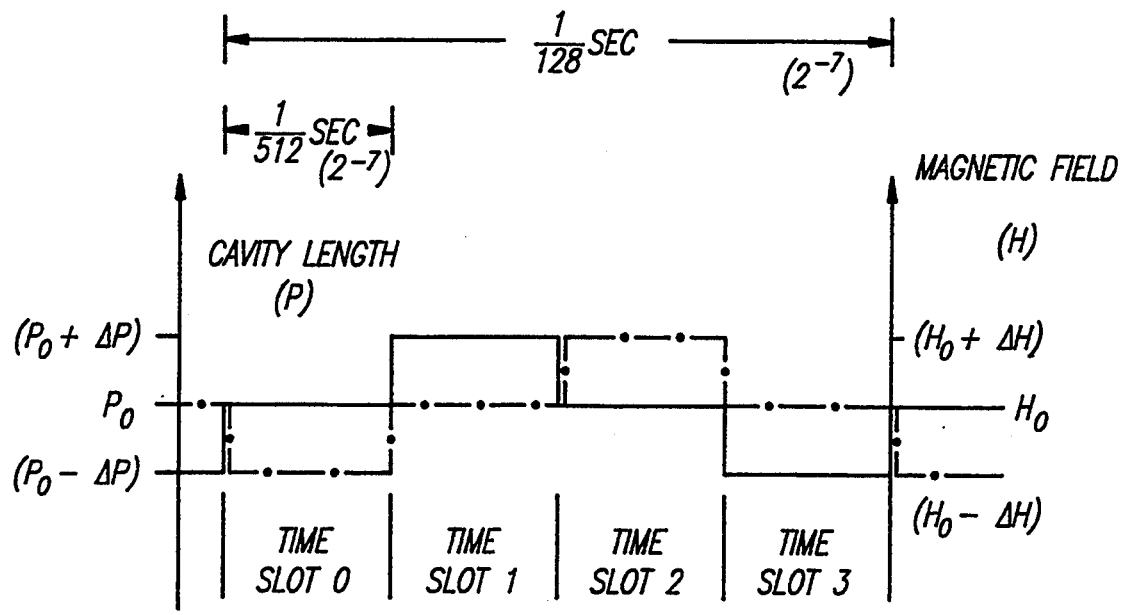
FIG. 5 is a schematic representation of a simple modulation/demodulation cycle to which the system of FIG. 3 can be subjected, wherein the applied magnetic field and the path length offset of the cavity are modulated in quadrature.

This is done in a unique modulation cycle taking the form of the solid line step function of FIG. 5 and repeated at a frequency of typically 128 Hertz. Under these circumstances, the bias (B) of the cavity 114 is known to be of the form $$B = B_o + \alpha(P-P_o)(H-H_o), \qquad (1)$$

in which $B_o$ is the constant bias of the cavity, $\alpha$ is the dispersion bias sensitivity coefficient, P is the path length of the cavity measured in volts, $P_o$ is the optimum path length, H is the applied magnetic bias and $H_o$ is the optimum magnetic bias. According to this formula, the variable portion of the bias due to dispersion effects is zero when either the path length (P) equals the optimum value of the path length ($P_o$) or the applied magnetic bias (H) equals the optimum value of applied magnetic bias ($H_o$). In either case, the bias reduces to the constant, $B_o$, which disappears when the differential output of the cavity is measured.

Figure 8:
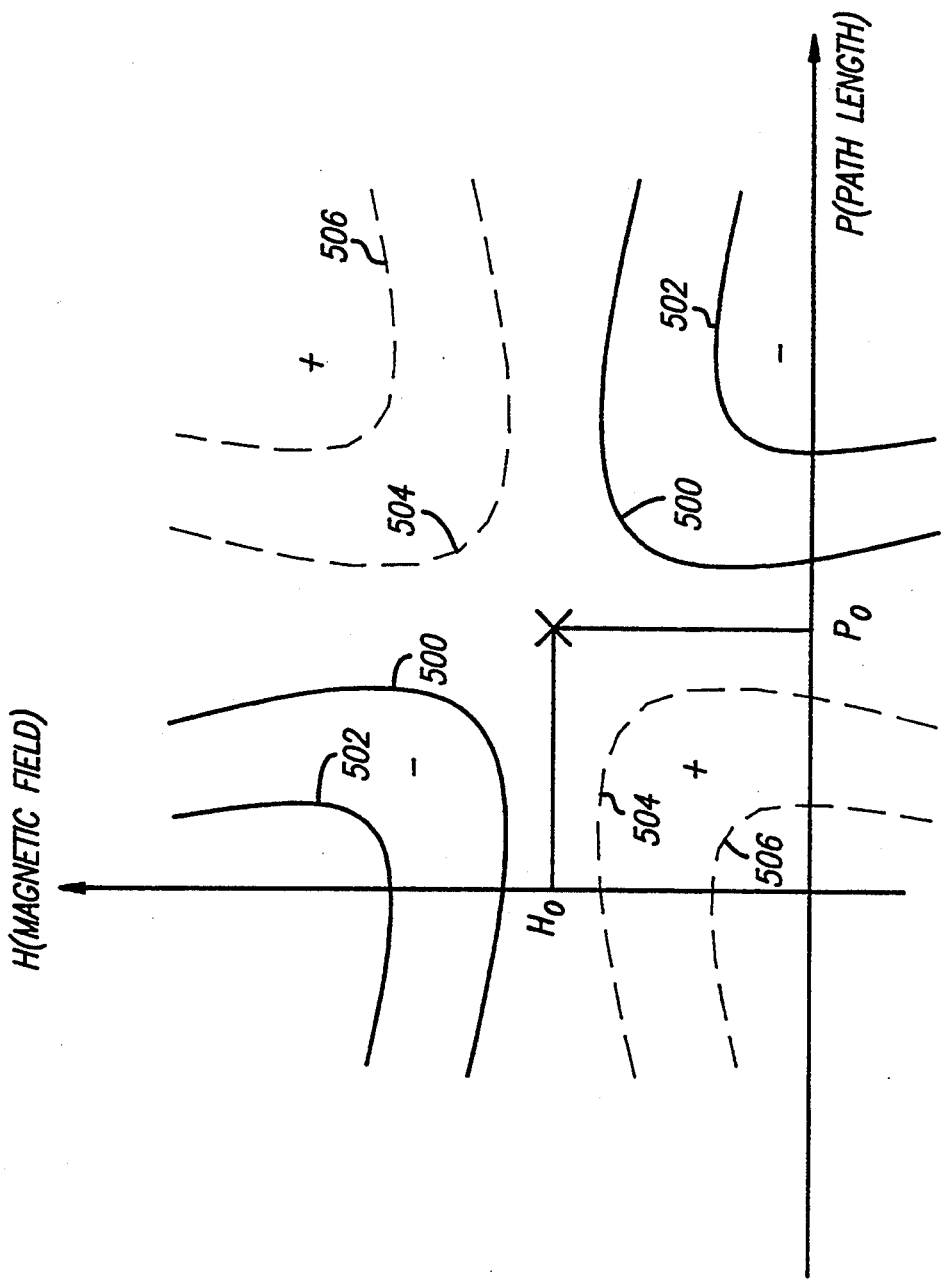
FIG. 8 is a plot of bias sensitivity as a function of cavity length and applied magnetic field wherein the curved lines represent loci of points having equal bias.

The relationship of equation (1) is depicted graphically in FIG. 8, which is a plot of bias sensitivity as a function of cavity path length and applied magnetic bias. Solid line curves 500 and 502 are curves of constant negative bias and broken line curves 504 and 506 are curves of constant positive bias due to dispersion. From the configuration of the curves 500-506, it can be seen that the path length of the cavity can be varied without introducing bias error, as long as the applied magnetic field is held at its optimum value. Similarly, the magnetic field can be varied without introducing error as long as the path length is held at its optimum value. Under these circumstances, the "quadrature" modulation scheme of FIG. 5 advantageously avoids the introduction of noise in the cavity output due to modulation.

Considering the case in which the path length control signal (P) is modulated to allow the observation of errors in the magnetic field (H), the four quarter cycles or "time slots" of the full line modulation curve of FIG. 5 give rise to the following values:

Time Slots 0 and 2: $P = P_o$ $$Bias\ (0, 2) = B_o + \alpha(P_o-P_o)(H-H_o) = B_o \qquad (2)$$

Time Slot 1: $P = P_o + \Delta P$ $$Bias\ (1) = B_o + \alpha(\Delta P)(H-H_o) \qquad (3)$$

Time Slot 3: $P = P - \Delta P$ $$Bias\ (3) = B_o - \alpha(\Delta P)(H - H_o) \qquad (4)$$

Thus, subtracting the gyro output created during Time Slot 3 from the output during Time Slot 1 gives $$Bias\ (1) - Bias\ (3) = 2\alpha(\Delta P)(H - H_o), \qquad (5)$$

which is proportional to the magnetic field error. This signal is used in the active control loop of the dispersion equalization system 112 to adjust the applied magnetic bias (H) to its optimum point ($H_o$).

It will be appreciated from the foregoing that a similar analysis applies when the magnetic field (H) is modulated according to the dash-dot waveform of FIG. 5, with the only difference being that the output values of the gyro which are subtracted to yield an error signal are the values during time slots designated 0 and 2, rather than those during time slots 1 and 3.

Since the path length, modulation and magnetic field modulation occur in different time slots, it is possible to apply them in the same modulation cycle, as illustrated in FIG. 5. In this event:

$$Bias\ (0) = B_o - \alpha(P - P_o)\Delta H$$

$$Bias\ (1) = B_o + \alpha\Delta P(H - H_o)$$

$$Bias\ (2) = B_o + \alpha(P - P_o)\Delta H$$

$$Bias\ (3) = B_o - \alpha\Delta P(H - H_o)$$

In order to implement the foregoing method, signals detected within the different time slots of the modulation cycle must be factored out of the het. signal. This is accomplished by the demodulator 130, as illustrated in detail in the block diagram of FIG. 4. Specifically, the demodulator 130 is made up of a time slot demodulator 160 and a series of four integrators 162, 164, 166 and 168, which receive and accumulate counts occurring during the four time slots. These accumulated counts, identified as S1, S2, S3 and S4, respectively, are then sampled at 170 and fed to the magnetic field controller 132 and the path length offset controller 134. Within the magnetic field controller 132, the output signals S1 and S3 are subtracted at block 172, subjected to a gain at 174 and integrated at 176 before being added to the modulation at the summing point 138 of FIG. 3. Similarly, in the path length offset controller 134, the output signals S0 and S2 are subtracted at block 178, subjected to a gain at 180 and integrated by integrator 182 before being applied to the cavity length control loop 144 of FIG. 3. In each case, the relevant parameter, i.e., the magnetic field error or the path length error, is measured at a time when only the other of the two control variables deviates from its optimal value due to the modulation. As the two servo loops operate, the inputs to the integrators 176 and 182 converge to zero, causing the magnetic bias and the path length offset to converge to their optimum values, $H_o$ and $P_o$, respectively.

Figure 4:
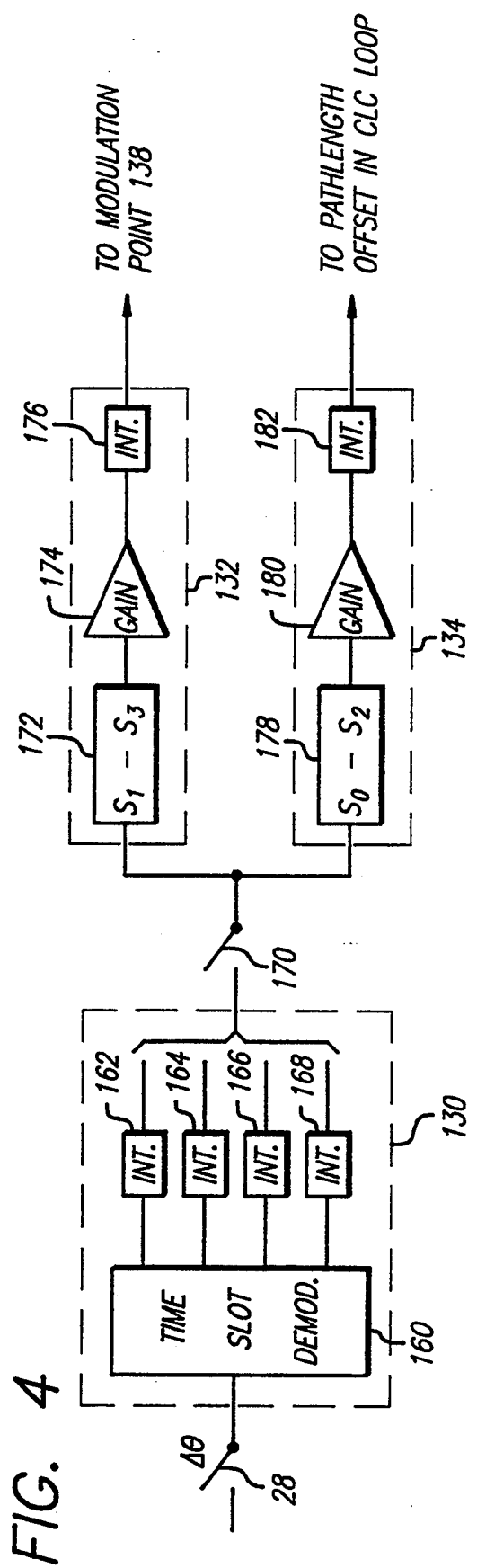
FIG. 4 is an enlarged block diagram showing the details of a portion of the system of FIG. 3.

Although the dispersion equalization system 112 of FIGS. 3 and 4 is capable of driving the magnetic field and the path length offset to their optimum values regardless of the precise modulation scheme employed, the modulation of FIG. 5 is preferred inasmuch as only one of the two control variables deviates from its preferred value at a given point in time. Because of the relationship of equation (1) above, this results in a zero bias error at all times once the loops have converged. In addition, it will be understood that the system of FIGS. 3 and 4 are operable to control the magnetic field and null dispersion bias even if only the path length of the cavity is modulated.

Returning to FIG. 3, control of cavity length is achieved by extracting a pair of commonly directed laser beams (either both clockwise or both anticlockwise) from a corner mirror 184 of the multi-oscillator cavity 114 and causing the two beams to impinge upon a photodiode 186 to mix the beams and create a signal having a frequency which is the difference between the two beam frequencies. This frequency difference, resulting largely from reciprocal splitting, is typically in the hundreds of megahertz (MHz). The mixed signal at the output of the photodiode 186 is amplified by a high frequency amplifier 188 and an RF amplifier 190 before being filtered by a band pass filter 192. The signal amplitude is then sensed by the amplitude detector 194 before being converted to a digital signal by an analog-to-digital converter 196. The resulting digital signal passes through a junction 198 to the cavity length control loop 144, an RF gain loop 200 and a modulation control loop 202. The output of the modulation control loop 202 not only controls a computer generated signal modulation source 148 which generates the solid line step function shown in FIG. 5, but also provides a timing signal to the cavity length control loop 144. The output of the cavity length control loop 144 and the modulation source 148 are superimposed at a summing junction 202 and processed by the digital-to-analog converter 152 before being fed to the path length control mirror 150. The path length control mirror 150 is preferably a mirror having a piezoelectric transducer which causes the mirror to move in a manner which varies the path length of the cavity in response to a control signal. The signal from the cavity length control circuitry 146 and the digital-to-analog converter 152 thus causes the mirror 150 to be maintained at an average position corresponding to the desired operating point of the cavity 114 and to be modulated at the modulation frequency (128 Hz in the example given) supplied by the modulation block 148. It is noted that other path length discriminants and methods can be used in conjunction with the dispersion equalization method disclosed herein.

By way of example, the modulation supplied by the block 148 in the embodiment of FIGS. 3 and 4 preferably has a frequency of 128 Hz. In a typical medium accuracy multi-oscillator gyro with a Faraday bias on the order of 1½ MHz and a bias sensitivity of approximately 1 degree/hour/gauss/MHz of cavity detuning, the magnetic bias and the path length of the cavity are then preferably modulated at amplitudes of approximately 0.03 gauss and 30 MHz, respectively.

Figure 6:
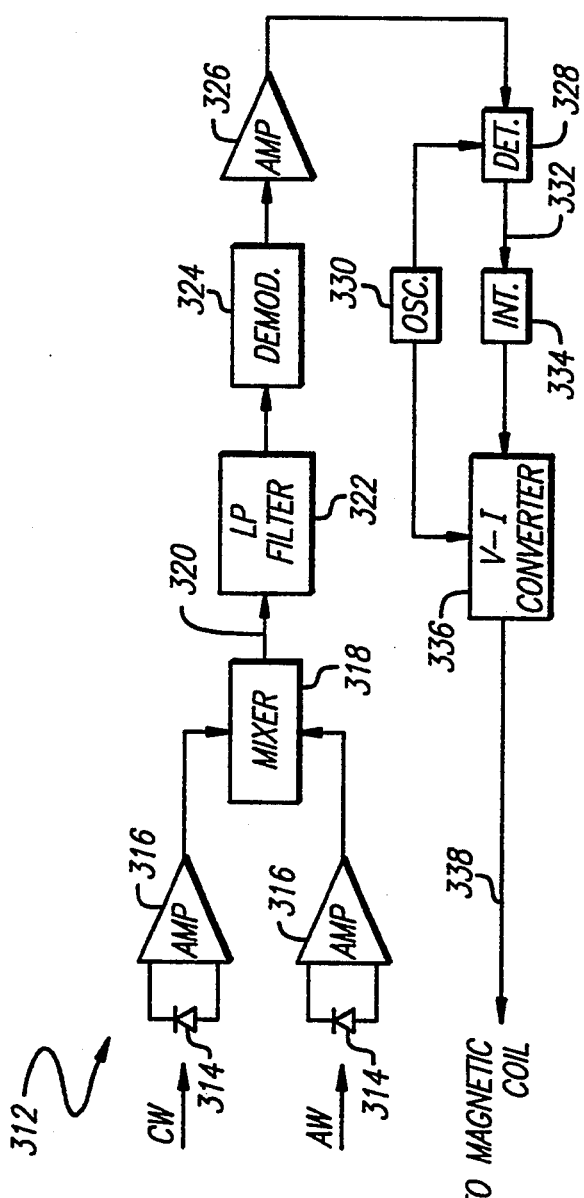
FIG. 6 is a block diagram of a dispersion equalization system constructed according to a further embodiment of the present invention.

Referring now to FIG. 6, a dispersion equalization system 312 constructed according to an alternative embodiment of the present invention is illustrated separately from the multi-oscillator cavity to which it relates. The system 312 controls a multi-oscillator cavity similar to the cavity 114 of FIG. 3, which may be any form of multi-oscillator mode inertial sensor including by way of example, a laser gyro or a laser accelerometer. The system 312 operates by modulating a magnetic bias supplied to the cavity, comparing the total clockwise (CW) beam with the total anticlockwise (AW) beam to obtain the difference between them, amplitude demodulating that difference, and synchronously detecting the error in amplitude as a measure of the correction which must be made to the magnetic bias in order to equalize dispersion. Correction is made by accumulating the error signal and applying it, along with the modulation frequency, to a magnetic coil associated with the cavity. This modulation of the magnetic bias control signal is low in amplitude and relatively high in frequency (typically between 1 and 10 kilohertz (KHz)) and is therefore properly referred to as a "dither".

The dispersion equalization system 312 receives information in the form of two groups of laser beams, one representing the two clockwise beams of the cavity and the other the two counterclockwise beams of the cavity. Each group of beams is extracted from the cavity through a partially transmissive mirror similar to the mirror 184 of FIG. 3 and impinges upon a corresponding photodiode 314. Thus, the two clockwise directed beams having different circular polarizations are mixed at the upper photodiode 314 and the two anticlockwise directed beams are mixed at the lower photodiode 314 to produce electrical signals having frequencies equal to the difference in frequencies of the two pairs of laser beams. These signals are amplified by amplifiers 316 and mixed by a mixer 318 to generate a signal at 320 which represents the product of the two amplified difference signals. The signal 320 is fed to a low pass filter 322 which passes the low frequency component of the difference signal to amplitude demodulator 324 for isolation of its amplitude modulation term. The demodulated signal is then amplified by a low frequency bandpass amplifier 326 and applied to a low frequency synchronous detector 328 which operates in conjunction with a local oscillator 330 to detect the amplitude component of the amplitude modulation term.

The output of the synchronous detector 328 is an error signal 332 which is positive when the inner pair of amplitudes of FIGS. 1B ($A_{LC}$ and $A_{RC}$) are greater than the outer pair of amplitudes ($A_{LA}$ and $A_{RA}$) and negative when the reverse is true. This signal is integrated by an active integrator 334 to generate a feedback signal which equalizes the amplitude. Modulation provided by the oscillator 330 is added to the feedback signal and the result converted to a current by a voltage-to-current converter 336. The current is applied to a magnetic coil of the cavity along a path 338 to shift the dispersion curves in the direction required to equalize the beam amplitudes. Thus, the detector 328, the oscillator 330, the active integrator 334 and voltage-to-current converter 336 combine to a form synchronous error detection scheme which generates an error signal representative of dispersion and nulls the error signal by adjustment of the magnetic bias control signal. As the net error signal is nulled, the output of the synchronous detector 328 goes to zero and the output of the voltage-to-current converter 336 approaches the value required to apply the optimum level of magnetic bias to the cavity.

In the case of a medium accuracy out of plane multioscillator gyro constructed according to the embodiment of FIG. 6, the clockwise beams may be separated by a frequency of approximately 857 MHz and the anticlockwise beams may be separated by a frequency of approximately 860 MHz. These differences correspond to the values 340 and 342, respectively, of FIG. 1B. The two difference signals are then mixed by the mixer 318 and filtered by the low pass filter 322 to yield a signal having a frequency of approximately 3 MHz which is fed to the amplitude demodulator 324. It is the amplitude modulation term of this signal which is amplified and synchronously detected to generate the correction required to equalize dispersion.

The operation of the dispersion equalization system 312 is supported analytically, as follows. The clockwise LCP beam signal $S_{LC}$, the anticlockwise LCP beam signal $S_{LA}$, the clockwise RCP beam signal $S_{RC}$ and the anticlockwise RCP beam signal $S_{RA}$ can be expressed by the following equations (6)-(9) in terms of their respective amplitudes ($A_{LC}$, $A_{LA}$, $A_{RC}$, $A_{RA}$) and angular frequencies ($\omega_{LC}$, $\omega_{LA}$, $\omega_{RC}$, $\omega_{RA}$) as a function of time:

$$S_{LC} = A_{LC} \cos \omega_{LC} t \qquad (6)$$

$$S_{LA} = A_{LA} \cos \omega_{LA} t \qquad (7)$$

$$S_{RC} = A_{RC} \cos \omega_{RC} t \qquad (8)$$

$$S_{RA} = A_{RA} \cos \omega_{RA} t \qquad (9)$$

The mixing of the two clockwise beam signals, $S_{LC}$ and $S_{RC}$, and the two anticlockwise beam signals, $S_{LA}$ and $S_{RA}$, results in a total clockwise beam signal ($S_{CW}$) and total anticlockwise beam signal ($S_{AW}$) which are generated at the respective photodiodes 314 of the system 312. These mixed signals are expressed by the following equations (10) and (11):

$$S_{CW} = A_{RC} A_{LC} \cos(\omega_{RC} - \omega_{LC})t = A_{CW} \cos \omega_{CW} t \qquad (10)$$

$$S_{AW} = A_{RA} A_{LA} \cos(\omega_{RA} - \omega_{LA})t = A_{AW} \cos \omega_{AW} t \qquad (11)$$

The combination ($S_C$) of the total clockwise beam signal ($S_{CW}$) with the total anticlockwise beam signal ($S_{AW}$) at the mixer 318 is expressed by the following equations (12)-(14):

$$S_C = S_{CW} \cdot S_{AW} \qquad (12)$$

$$= (A_{CW} \cos \omega_{CW} t)(A_{AW} \cos \omega_{AW} t) \qquad (13)$$

$$= \tfrac{1}{2} \cdot A_{CW} A_{AW} [\cos(\omega_{CW} - \omega_{AW})t + \cos(\omega_{CW} + \omega_{AW})t] \qquad (14)$$

The low pass filter 322 removes the high frequency component of this signal, leaving the signal $S_{C1}$, as expressed by the following equation (15):

$$S_{C1} = \tfrac{1}{2} A_{CW} A_{AW} [\cos(\omega_{CW} - \omega_{AW})t] \qquad (15)$$

The signal $S_{C1}$ is modulated by a magnetic bias dither signal ($A \cos \omega_m t$) which is produced by the local oscillator 330. The dithering frequency ($\omega_m$) ranges between about one (1) KHz and about ten (10) KHz. However, the preferred frequency is about four (4) KHz. The total signal $S_m$, including the magnetic bias modulation, is expressed by equation (16) as follows:

$$S_m = \tfrac{1}{2}(A_{CW} + A_{CW}' \cdot A \cos \omega_m t) \cdot (A_{AW} + A_{AW}' \cdot A \cos \omega_m t) \cdot \qquad (16)$$
$$[\cos(\omega_{CW} t + \omega_{AC} t + 2 \cdot M_f \cdot \sin \omega_m t) +$$
$$\cos(\omega_{CW} t - \omega_{AW} t)]$$

where A is the amplitude of dithering, $A_{CW}'$ is the derivative of $A_{CW}$ with respect to the amplitude ($dA_{CW}/dA$) $A_{AW}'$ is the derivative of $A_W$ with respect to the amplitude ($dA_{Aw}/dA$), and $M_f$ is the FM modulation index for the four modes.

As seen from equation (16), the term $$\tfrac{1}{2}(A_{CW}+A_{CW'}\cdot A\cos\omega_m t)\cdot(A_{AW}+A_{AW'}\cdot A\cos\omega_m t) \quad (17)$$

is the amplitude modulation term of the mixed signal, while the term $$\cdot[\cos(\omega_{CW}t+\omega_A{}_Ct+2\cdot M_f\sin\omega_m t)+\cos(\omega_{CW}t-\omega_{AW}t)] \quad (18)$$

is the frequency modulation term. Thus, after demodulating the signal $S_m$ by means of the amplitude demodulator 324, only the amplitude modulation term remains and the demodulated signal $S_a$ can be expressed in equations (19) and (20) as follows:

$$S_a = (A_{CW} + A_{CW'}\cdot A\cos\omega_m t)\cdot(A_{AW} + A_{AW'}\cdot A\cos\omega_m t) \quad (19)$$

$$= A_{CW}\cdot A_{AW} + (A_{CW}\cdot A_{AW'} + A_{AW}\cdot A_{CW'})\cdot A\cos\omega_m t + \quad (20)$$

$$\tfrac{1}{2}A_{CW'}\cdot A_{AW'}\cdot A^2(1 + \cos 2\omega_m t)$$

The error term in the amplitude expression ($S_a$) is $A_{CW}\cdot A_{AW'}+A_{AW}\cdot A_{CW'}$. Its sign is opposite for differently polarized beams of the same direction, causing the quantity to be zero on average when dispersion is equalized. The synchronous detection circuitry of FIG. 6 detects the error term and integrates it over time, creating an output which tends to null the error signal. Thus, the system of FIG. 6 applies a current to the magnetic bias coil (via the line 338) which is precisely the value required to equalize dispersion and actively maintains that condition as the multi-oscillator cavity operates.

Figure 7:
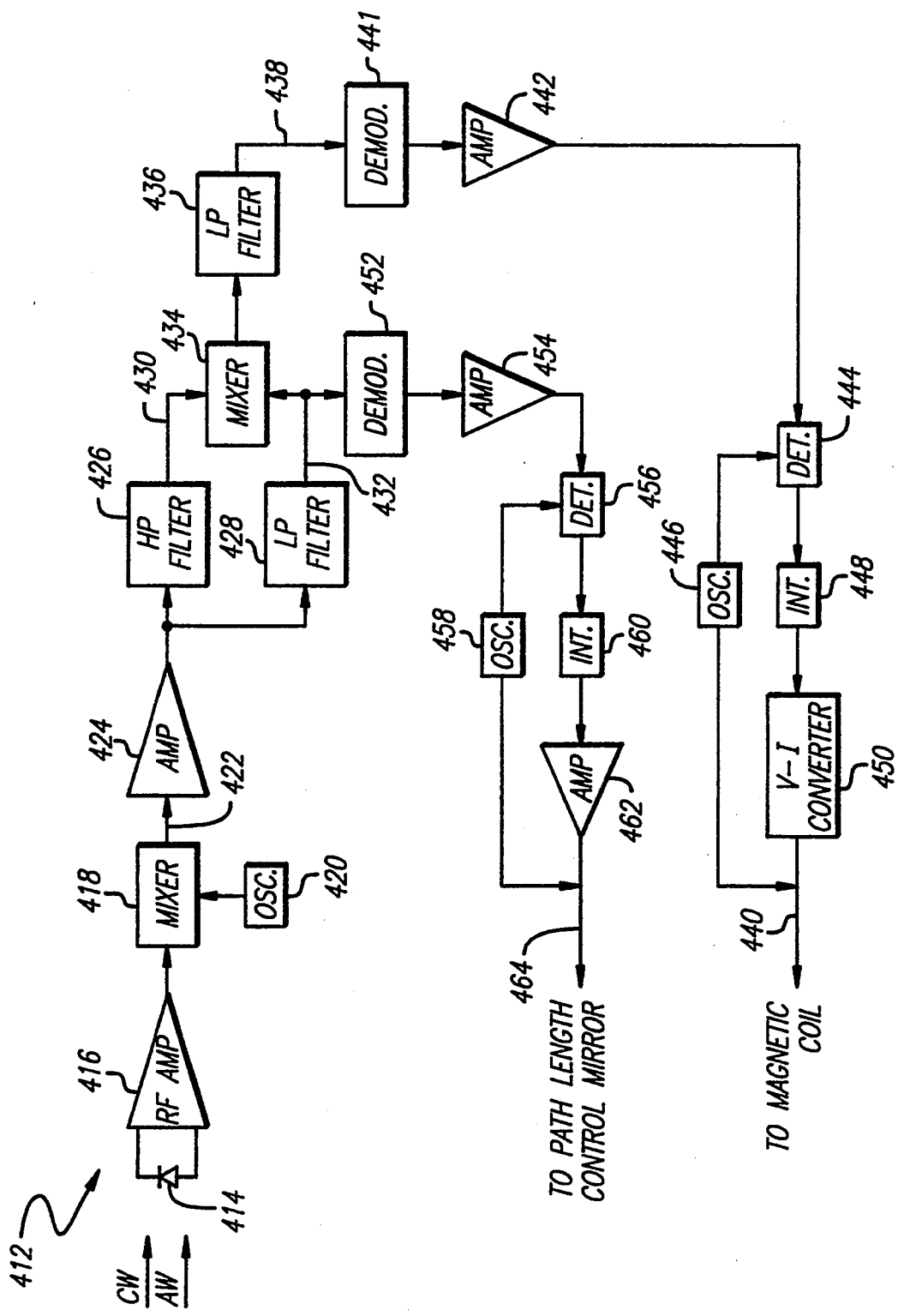
FIG. 7 is a block diagram of a dispersion equalization system constructed according to a still further embodiment of the present invention, the system of FIG. 7 being a variation of the system of FIG. 6 which includes path length offset control.

Referring now to FIG. 7, a dispersion equalization system 412 constructed according to yet another preferred embodiment of the present invention extracts information from the clockwise and anticlockwise groups of beams to create both a magnetic bias control signal applied to a coil associated with the cavity and a path length control signal applied to a path length control mirror of the cavity. These signals maintain the system at the optimal magnetic bias and path length conditions for dispersion equalization. The clockwise pair of beams and the anticlockwise pair of beams are extracted from the multi-oscillator cavity (not shown) as described in connection with the system 312 of FIG. 6, and are detected by a single photodiode 414 connected across an RF amplifier 416. The two clockwise pairs of beams impinge upon the photodiode 414 at different locations, causing the clockwise beams to be mixed and the anticlockwise beams to be mixed such that the output of the RF amplifier 416 contains both signals. This composite output contains one component with a frequency equal to the value indicated in FIG. 1B as 340 and another component with a frequency equal to the value indicated in FIG. 1B as 342. Applying the frequency values discussed in connection with FIG. 6, the two mixed signals would have frequencies of 857 MHz and 860 MHz, respectively.

The two signals contained in the output of the amplifier 416 are then mixed at a mixer 414 with a sinusoidal signal provided by a local oscillator 420. In the example given, the local oscillator preferably has a frequency of 862 MHz, creating an output at 422 which contains two mixed signals, one having a frequency of 5 MHz and the other having a frequency of 2 MHz. This combined signal is then amplified by an amplifier 424 and separated by a pair of filters 426 and 428 to isolate the 5 MHz signal at 430 and the 2 MHz signal at 432. The 5 MHz signal and the 2 MHz signal are themselves mixed by a mixer 434 and filtered by a low pass filter 436 to yield a signal having a frequency of 3 MHz at the location 438.

The 3 MHz difference signal, which is equivalent to the output of the low pass filter 322 of FIG. 6, is then subjected to amplitude demodulation and synchronous error detection steps similar to those of FIG. 6 to create an output 440 to the magnetic coil (not shown) associated with the multi-oscillator cavity. Thus, the signal at 438 is applied to an amplitude demodulator 441 to isolate the amplitude modulation term of the signal, and the amplitude modulation term is amplified by a low frequency bandpass amplifier 442. The output of the amplifier 442 is applied to a synchronous detector 444 which acts in conjunction with a local oscillator 446 to create an error signal that is integrated by an active integrator 448 and converted to a control current by a voltage-to-current converter 450. The control current is then modulated at the preselected dithering frequency by the local oscillator 446 to create the bias control signal at 440. The disclosed circuitry thus detects and integrates the error measured in the amplitude modulation term of the difference signal created by mixing the total clockwise signal with the total anticlockwise signal of the cavity. The result is the current which must be passed through the magnetic coil of the cavity in order to equalize dispersion.

As mentioned above, the dispersion equalization system 412 of FIG. 7 controls the path length of the cavity as well as the magnetic bias applied to it. By controlling both aspects of cavity operation, it is possible to precisely equalize the effects of dispersion and thereby eliminate drift error.

The circuitry used to control the path length of the cavity in the system of FIG. 7 is the same as that disclosed in U.S. Pat. No. 4,963,026 for CAVITY LENGTH CONTROL APPARATUS FOR A MULTI-OSCILLATOR, the disclosure of which is hereby incorporated by reference for all purposes. Thus, the output of the low pass filter 428, which represents the difference between the combined anticlockwise beams within the cavity and the signal of the local oscillator 420, is applied to an amplitude demodulator 452 and a low frequency bandpass amplifier 454 to yield the amplitude modulation portion of the difference signal. The resulting signal is then applied to a synchronous detection circuit made up of a synchronous detector 456, a local oscillator 458, an integrator 460 and an amplifier 462. The synchronous detector 456, which receives the amplitude modulation portion of the signal and the output of the local oscillator 458, combines the two to generate an error signal which is integrated by the integrator 460, amplified by the amplifier 462, and modulated using the oscillator signal 458 to create a dithered path length control signal at 464 for application to a path length control mirror of the multi-oscillator cavity.

From the above it can be seen that the system and method of the present invention actively equalize dispersion by modulating the laser beams within the cavity and nulling a detected error signal through adjustment of at least a magnetic bias applied to the cavity. The system is thus able to react rapidly and accurately to changing conditions, eliminating drift error due to dispersion.

While certain specific embodiments of the invention have been disclosed as typical, the invention is not limited to these particular forms, but rather is applicable broadly to all such variations as fall within the scope of the appended claims.

What is claimed is:

1. A system for equalizing dispersion in a multi-oscillator cavity which is capable of sustaining a substantially left circularly polarized pair of counterpropagating laser beams and a substantially right circularly polarized pair of counterpropagating laser beams and includes magnetic bias apparatus for subjecting the cavity to a magnetic bias in response to a bias control signal, the system comprising in combination:

means for generating a modulated bias control signal and applying it to the magnetic bias apparatus;

detection means for extracting information from said laser beams;

signal processing means for receiving said beam information and generating an error signal representative of dispersion bias; and correction means for nulling said error signal by adjustment of said modulated bias control signal.

2. An inertial instrument of the multi-oscillator type comprising:

an optical cavity capable of sustaining a substantially left circularly polarized pair of counterpropagating laser beams and a substantially right circularly polarized pair of counterpropagating laser beams;

magnetic bias apparatus for subjecting the cavity to a magnetic bias in response to a bias control signal;

apparatus for generating a modulated bias control signal and applying it to the magnetic bias apparatus;

detection means for extracting information from said laser beams;

signal processing means for receiving said beam information and generating an error signal representative of dispersion due to the level of the magnetic bias; and correction means for nulling said error signal by adjustment of said modulated bias control signal.

3. The inertial instrument of claim 2 which further comprises:

at least one transducer for controlling the path length of the cavity in response to a path length control signal; and means for modulating the path length control signal.

4. The inertial instrument of claim 3 wherein:

said detection means comprises means for heterodyning each of said pairs of counterpropagating laser beams and counting the resulting beats to yield an angular rate output of the cavity.

5. The inertial instrument of claim 2 wherein:

said detection means comprises:

means for mixing at least one of the laser beams that propagate in a clockwise direction within the cavity with at least one of the laser beams that propagate in an anticlockwise direction within the cavity to yield the product thereof; and said signal processing means comprises:

demodulating means for demodulating said product; and control means for utilizing the output of said demodulation means to adjust the bias control signal to null said error signal.

6. The inertial instrument of claim 2 wherein:

said detection means comprises:

means for combining laser beams that propagate in a clockwise direction within the cavity to form a combined clockwise signal and combining laser beams that propagate in an anticlockwise direction within the cavity to form a combined anticlockwise signal; and mixing means for mixing the combined clockwise signal with the combined anticlockwise signal to yield the product thereof; and said signal processing means comprises:

demodulation means for demodulating said product; and control means for utilizing the output of said demodulation means to adjust the bias control signal to null said error signal.

7. An inertial instrument of the multi-oscillator type comprising:

an optical cavity capable of sustaining a substantially left circularly polarized pair of counterpropagating laser beams and a substantially right circularly polarized pair of counterpropagating laser beams;

at least one transducer for controlling the path length of the cavity in response to a path length control signal;

apparatus for subjecting the cavity to a magnetic bias in response to a bias control signal;

modulation means for modulating at least the bias control signal;

detection means for extracting information from said laser beams;

signal processing means for receiving said beam information and generating a first error signal representative of dispersion error due to the path length of the cavity and a second error signal representative of dispersion error due to the level of the magnetic bias;

first correction means for nulling said first error signal by adjustment of the path length control signal; and second correction means for nulling said second error signal by adjustment of the bias control signal.

8. The inertial instrument of claim 7 wherein:

said detection means comprises means for heterodyning each of said pairs of counterpropagating laser beams and counting the resulting beats to yield an angular rate output of the cavity, 9. The inertial instrument of claim 8 wherein:

said modulation means comprises means for independently modulating the path length control signal and the bias control signal.

10. The inertial instrument of claim 8 wherein:

said modulation means comprises means for modulating the path length control signal and the bias control signal so that their values are altered in sequence at different times in each of a plurality of modulation cycles to create a plurality of time slots within each cycle during which specific alterations occur.

11. The inertial instrument of claim 10 wherein:

said detection means further comprises means for demodulating and individually summing beats detected in each respective time slot of said modulation.

12. The inertial instrument of claim 8 wherein:

said modulation means comprises means for modulating the path length control signal and the bias control signal in quadrature.

13. The inertial instrument of claim 7 wherein:

said detection means comprises:
  means for combining laser beams that propagate in a clockwise direction within the cavity to form a combined clockwise signal and combining laser beams that propagate in an anticlockwise direction within the cavity to form a combined anticlockwise signal; and
  mixing means for mixing the combined clockwise signal with the combined anticlockwise signal to yield the product thereof; and
said signal processing means comprises:
  demodulation means for demodulating said product; and
  control means for utilizing the output of said demodulation means to adjust the modulated path length control signal and the bias control signal to null said first and second error signals, respectively.

14. The inertial instrument of claim 13 wherein: said comparison means comprises a synchronous detector.

15. A method for equalizing dispersion in a multi-oscillator cavity which is capable of sustaining a substantially left circularly polarized pair of counterpropagating laser beams and a substantially right circularly polarized pair of counterpropagating laser beams and includes apparatus for subjecting the cavity to a magnetic bias in response to a bias control signal, comprising the steps of:
  extracting information from said laser beams by:
    combining laser beams that propagate in a clockwise direction within the cavity to form a combined clockwise signal; and
    combining laser beams that propagate in an anticlockwise direction within the cavity to form a combined anticlockwise signal; and
  mixing the combined clockwise signal with the combined anticlockwise signal to yield the product thereof;
  processing said beam information and generating an error signal representative of dispersion bias, said processing
  and generating step including demodulating said product; and nulling said error signal by adjustment of said bias control signal in response to the output of said demodulation.

16. A method for equalizing dispersion in a multi-oscillator cavity which is capable of sustaining a substantially left circularly polarized pair of counterpropagating laser beams and a substantially right circularly polarized pair of counterpropagating laser beams and includes magnetic bias apparatus for subjecting the cavity to a magnetic bias in response to a bias control signal, comprising the steps of:
  generating a modulated bias control signal and applying it to the magnetic bias apparatus;
  extracting information from said laser beams;
  processing said beam information and generating an error signal representative of dispersion bias; and
  nulling said error signal by adjustment of said modulated bias control signal.

17. The method of claim 16 wherein the step of extracting information from the laser beams includes:
  heterodyning each of said pairs of counterpropagating laser beams and counting the resulting beats to yield an angular rate output of the cavity.

18. The method of claim 15 wherein:
  the step of extracting information from the laser beams includes:
    mixing at least one of the laser beams that propagate in a clockwise direction within the cavity with at least one of the laser beams that propagate in an anticlockwise direction within the cavity to yield the product thereof; and
  the step of processing said beam information and generating an error signal includes:
    demodulating said product; and
    utilizing the output of said demodulation to adjust the bias control signal to null said error signal.

19. The method of claim 15 wherein
  the step of extracting information from the laser beams includes:
    combining laser beams that propagate in a clockwise direction within the cavity to form a combined clockwise signal; and
    combining laser beams that propagate in an anticlockwise direction within the cavity to form a combined anticlockwise signal;
    mixing the combined clockwise signal with the combined anticlockwise signal to yield the product thereof; and the step of processing said beam information and generating an error signal comprises:
    demodulating said product; and
    utilizing the output of said demodulation to adjust the bias control signal to null said error signal.

20. A method for equalizing dispersion in a multi-oscillator cavity which: a) is capable of sustaining a substantially left circularly polarized pair of counterpropagating laser beams and a substantially right circularly polarized pair of counterpropagating laser beams; b) has at least one transducer acting in response to a path length control signal for controlling the path length of its optical cavity; and c) includes magnetic bias apparatus for subjecting the cavity to a magnetic bias in response to a bias control signal; the method comprising the steps of:
  modulating at least the bias control signal;
  extracting information from said laser beams;
  processing said beam information and generating a first error signal representative of dispersion error due to the path length of the cavity and a second error signal representative of dispersion error due to the level of the magnetic bias;
  nulling said first error signal by adjustment of the path length control signal; and
  nulling said second error signal by adjustment of the bias control signal.

21. The method of claim 20 wherein said modulation step includes:
  modulating the path length control signal and the bias control signal so that their values are altered in sequence at different times in each of a plurality of modulation cycles to create a plurality of time slots within each cycle during which specific alterations occur.

22. The method of claim 21 wherein the step of extracting information from the laser beams includes:
  demodulating and individually summing beats detected in each respective time slot of said modulation.

23. An inertial instrument of the multi-oscillator type comprising:
  an optical cavity capable of sustaining a substantially left circularly polarized pair of counterpropagating laser beams and a substantially right circularly polarized pair of counterpropagating laser beams;

apparatus for subjecting the cavity to a magnetic bias in response to a bias control signal; detection means for extracting information from said laser beams, said detection means comprising;

means for combining said laser beams that propagate in a clockwise direction within the cavity to form a combined clockwise signal and combining said. laser beams that propagate in an anticlockwise direction within the cavity to form a combined anticlockwise signal; and mixing means for mixing the combined clockwise signal with the combined anticlockwise signal to yield the product thereof; and signal processing means for receiving said beam information and generating an error signal representative of dispersion due to the level of the magnetic bias, said signal processing means comprising:

demodulation means for demodulating said product; and control means responsive to the output of the demodulation means, said control means comprising correction means for hulling said error signal by adjustment of the bias control signal.

24. An inertial instrument of the multi-oscillator type comprising:

an optical cavity capable of sustaining a substantially left circularly polarized pair of counterpropagating laser beams and a substantially right circularly polarized pair of counterpropagating laser beams;

at least one transducer for controlling the path length of the cavity in response to a path length control signal;

apparatus for subjecting the cavity to a magnetic bias in response to a bias control signal;

modulation means for modulating at least one of the path length control signal and the bias control signal;

detection means for extracting information from said laser beams, said detection means comprising;

means for combining said laser beams that propagate in a clockwise direction within the cavity to form a combined clockwise signal and combining said laser beams that propagate in an anticlockwise direction within the cavity to form a combined anticlockwise signal; and mixing means for mixing the combined clockwise signal with the combined anticlockwise signal to yield the product thereof;

signal processing means for receiving said beam information and generating a first error signal representative of dispersion error due to the path length of the cavity and a second error signal representative of the level of the magnetic bias, said signal processing means comprising:

demodulation means for demodulating said product; and control means responsive to the output of the demodulation means, said control means comprising:

first correction means for nulling said first error signal by adjustment of the path length control signal; and second correction means for hulling said second error signal by adjustment of the bias control signal.

25. The inertial instrument of claim 24 wherein: said comparison means comprises a synchronous detector.

* * * * *

UNITED STATES PATENT AND TRADEMARK OFFICE
CERTIFICATE OF CORRECTION

PATENT NO. : 5,374,990
DATED : December 20, 1994
INVENTOR(S) : Tae W. Hahn et al.

It is certified that error appears in the above-indentified patent and that said Letters Patent is hereby corrected as shown below:

Column 2, line 15, delete "clockwise beam";

Column 2, line 17, after "($A_{RA}$)", insert --.--;

Column 4, line 60, after "10", insert --"--;

Column 7, line 58, delete "tc," and replace with --to--;

Column 17, line 8, after "said" delete ".";

Column 17, line 22, delete "hulling" and replace with --nulling--; and

UNITED STATES PATENT AND TRADEMARK OFFICE
CERTIFICATE OF CORRECTION

PATENT NO. : 5,374,990
DATED : December 20, 1994
INVENTOR(S) : Tae W. Hahn, et. al.

It is certified that error appears in the above-indentified patent and that said Letters Patent is hereby corrected as shown below:

Column 18, line 29, delete "hulling" and replace with -- nulling--.

Signed and Sealed this

Ninth Day of May, 1995

Attest:

BRUCE LEHMAN

Attesting Officer

Commissioner of Patents and Trademarks